(12) United States Patent
Blaum et al.

(10) Patent No.: US 8,301,948 B2
(45) Date of Patent: Oct. 30, 2012

(54) STORAGE DEVICE WITH ADAPTIVE ERROR-CORRECTING CODE FOR IMPROVED AREAL EFFICIENCY

(75) Inventors: Mario Blaum, San Jose, CA (US); Kurt A. Rubin, San Jose, CA (US); Manfred E. Schabes, Saratoga, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 582 days.

(21) Appl. No.: 12/538,367

(22) Filed: Aug. 10, 2009

(65) Prior Publication Data

US 2011/0035634 A1  Feb. 10, 2011

(51) Int. Cl.
G06F 11/00 (2006.01)
G06F 11/30 (2006.01)
G08C 25/00 (2006.01)
H03M 13/00 (2006.01)
H04L 1/00 (2006.01)
G11C 29/00 (2006.01)

(52) U.S. Cl. ........ 714/746; 714/760; 714/766; 714/769; 714/770

(58) Field of Classification Search .................. None
See application file for complete search history.

(56) References Cited

U.S. PATENT DOCUMENTS

| 5,128,946 A | 7/1992 | Ogino et al. |
| 5,444,719 A | 8/1995 | Cox et al. |
| 5,751,733 A | 5/1998 | Glover |
| 5,872,800 A | 2/1999 | Glover et al. |
| 6,219,814 B1 | 4/2001 | Coker et al. |
| 6,512,644 B1 | 1/2003 | Hall et al. |
| 6,651,213 B2 | 11/2003 | Hassner et al. |
| 6,661,591 B1 | 12/2003 | Rothberg |
| 6,798,595 B2 | 9/2004 | Saito |
| 7,417,816 B2 | 8/2008 | Aratani et al. |
| 2007/0150793 A1 | 6/2007 | Monen et al. |
| 2009/0002868 A1 | 1/2009 | Mallary et al. |
| 2009/0003144 A1 | 1/2009 | Mallary et al. |

FOREIGN PATENT DOCUMENTS

| JP | 59116937 A | 7/1984 |
| JP | 63200238 A | 8/1988 |
| JP | 1307063 A | 12/1989 |
| JP | 6267202 A | 9/1994 |

OTHER PUBLICATIONS

Alma Riska et al., "Idle Read After Write—IRAW," USENIX Annual Technical Conference, 2008, pp. 43-56.

*Primary Examiner* — Guerrier Merant (57) ABSTRACT

A method for adaptively applying an error-correcting code to a storage device is disclosed. A determination is made that a system is in an idle state of input/output requests. First data symbols are copied into a first location within a buffer. First data symbol errors corrected using a first error-correcting code. Second data symbols including corrected bits are written in a second location on the recording media with a second error-correcting code. An error number for the second data symbols in the second location is determined. If the error number is below a first threshold error number, the first data symbols are deleted. If the error number is above the first threshold error number, the second data symbols are deleted.

24 Claims, 5 Drawing Sheets

| Sector ID | Compact Data | Date and Time | X (Error Condition) |
|---|---|---|---|
| 1 | 1 | 2009-10-23 12:01:33 | 0 |
| 2 | 0 | 2009-11-03 08:03:30 | 1 |
| 3 | 1 | 2009-01-03 03:16:51 | 1 |
| 4 | 1 | 2008-07-12 01:25:03 | 0 |
| 5 | 1 | 2008-08-01 02:03:45 | 1 |

FIG. 4

FIG. 5

STORAGE DEVICE WITH ADAPTIVE ERROR-CORRECTING CODE FOR IMPROVED AREAL EFFICIENCY

BACKGROUND OF THE INVENTION

1. Technical Field

The present invention relates in general to storage devices, in particular, to an improved system, method and apparatus for a storage device with adaptive error-correcting codes for improved areal efficiency of a magnetic hard disk.

2. Description of the Related Art

There is increasingly difficulty to increase the areal density of hard disk drive storage devices, due to the challenges of improving the performance of components (media, head, and channel) associated with recording at smaller recording geometries. This is the case for perpendicular, discrete-tract media, patterned, and thermal-assisted record recording systems. At the same time, methods must be provided to strengthen data robustness and guard against thermal decay of the data. Thermal decay is especially serious in bit-patterned media where each island stores a channel bit. What is needed is a method to continue to lower the probability of accumulating written-in channel bit errors which over time may be exacerbated by thermal decay and ultimately may exceed the capability of a modestly-sized error-correcting code (ECC). Brute-force pathways of adding more and more ECC are available in principle. But, they come at the expense of lower user-bit density.

In continuous granular media, scaling of grain sizes has become increasingly difficult. As a consequence, the number of grains per bit has been decreasing. This implies that the intrinsic media signal-to-noise ratio (SNR) has been diminishing. Extending continuous granular media may therefore be predicated on the ability to operate in lower SNR environments than is currently customary. Given that reduction of fabrication tolerances of bit-patterned media manufacture is entailing considerable expense, in order to reduce the expense, a higher percentage of written-in errors during initial write may be accepted in certain circumstances. Locally, at a certain period of time, there may be a very strong and expensive ECC applied. During the initial write, a strong ECC may be needed in order to guarantee the recovery of the user-bits.

SUMMARY OF THE INVENTION

Embodiments of a system, method, and apparatus for adaptively applying an error-correcting code to a storage device are disclosed. A determination is made that a system is in an idle state of input/output requests. First data symbols are copied into a first location within a buffer. First data symbol errors are corrected using a first error-correcting code. Second data symbols including corrected bits are written in a second location on the recording media with a second error-correcting code. An error number for the second data symbols in the second location is determined. If the error number is below a first threshold error number, the first data symbols are deleted. If the error number is above the first threshold error number, the second data symbols are deleted.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention are attained and can be understood in more detail, a more particular description of the invention briefly summarized above may be had by reference to the embodiments thereof that are illustrated in the appended drawings. However, the drawings illustrate only some embodiments of the invention and therefore are not to be considered limiting of its scope as the invention may admit to other equally effective embodiments.

DETAILED DESCRIPTION OF THE INVENTION

Figure 1:
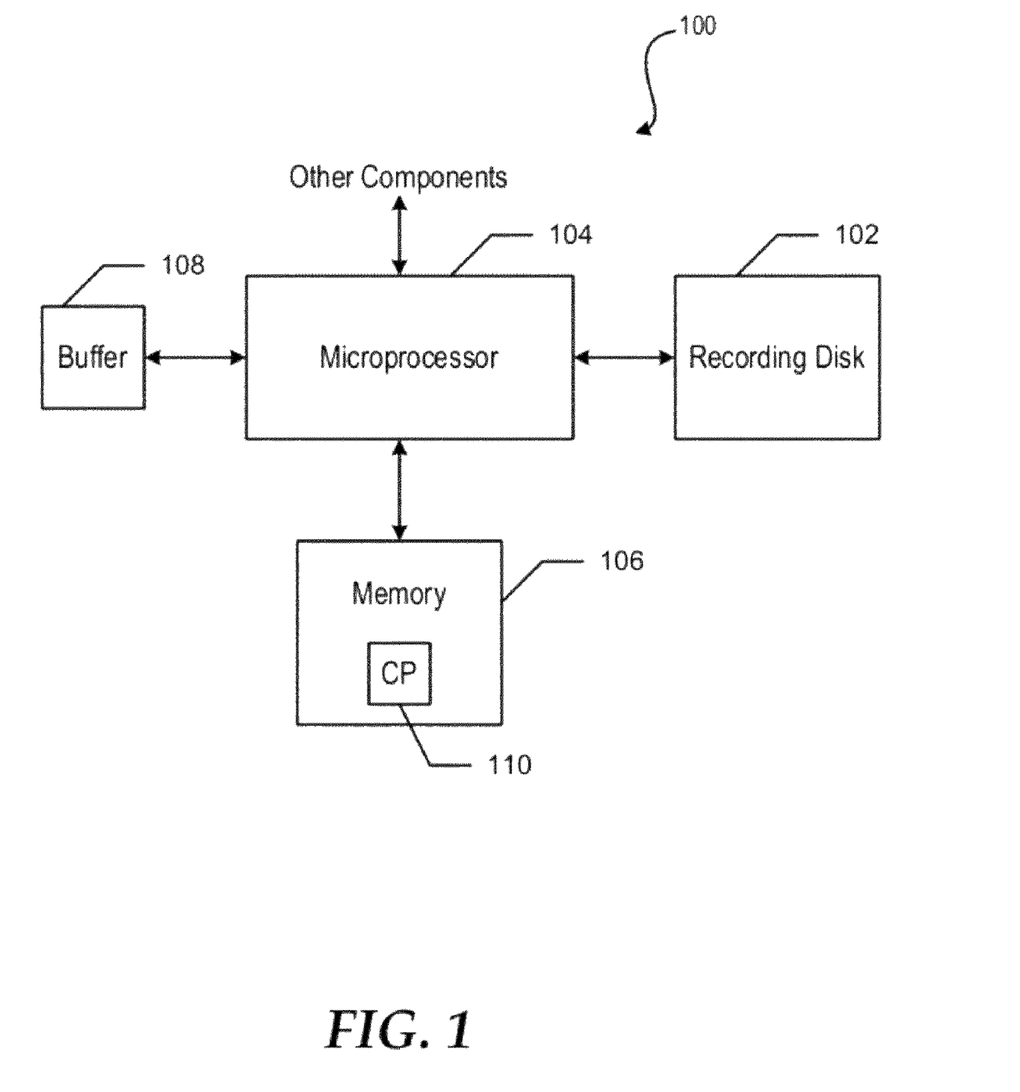
FIG. 1 is a block diagram of a hard disk drive in accordance with the invention.

Referring to FIG. 1, embodiments of a system, method and apparatus of a storage device, such as adaptively applying an error-correcting code (ECC) to the storage media of the storage device, are disclosed. The storage device can be any recording disk, such as a magnetic storage hard disk (HD), an optical disk, and/or a Flash memory. As a Flash memory storage device is used, some bits begin to wear out. Thus, the strength of the ECC for the Flash memory storage device can be increased as the Flash memory storage device is used to ensure that the data can be read back reliably. In a magnetic disk storage device, a powerful ECC can be used for the first writing of the data and then thru the process described below, the strength of the ECC can be selectively reduced.

As data is written on a recording media, the data symbols can be protected with an ECC. The written symbols can suffer two types of errors: systematic errors and transient errors. The systematic errors can appear each time the data is read, and can be due to defects in writing. For example, in patterned media some of the islands can be written off-phase and can always produce the same error when read back. If the systematic errors can be eliminated or at least greatly reduced, the ECC can be used to correct mostly transient errors. Thus, redundant ECC symbols can be diminished and user-bit densities can be increased, since symbols previously occupied by ECC symbols can now be used for data.

In a disk storage device, in a first write, a powerful ECC can be used that allows for correction of both systematic and transient errors. When the system is idle, data symbols can be copied into a buffer and corrected using the powerful ECC. The buffer can be a memory in the disk storage device or a location on the recording disk. Once the errors are identified, the errors can be corrected and the corresponding bits can be rewritten on the recording media. This procedure can be repeated a plurality of times until systematic errors are substantially eliminated and the corresponding bits are substantially correctly written in the recording media. Once most of the systematic errors have been corrected, the need for powerful ECC can be diminished and bits occupied by the powerful ECC can be released and used for data.

FIG. 1 shows a hard disk drive (HDD) 100 including a recording disk or HD 102, a microprocessor 104, and a memory 106, and a buffer 108. The microprocessor 104 is in communication with the HD 102, with the memory 106, with the buffer 108, and with other components of the hard disk drive 100. In one embodiment, the HD 102 can be a patterned magnetic HD, such that each bit of data stored on the HD can be located on a separate island preferably not magnetically connected to the neighboring bit island. The HD 102 can be preferably divided into sectors of data cylindrically arranged around the HD. In another embodiment, the HD 102 can be a discrete-tract media storage device, such that the bit islands are preferably separate discrete locations on the HD, but the separate locations can be magnetically coupled together. In another embodiment, the HD 102 can include a magnetic disk that is divided into different continuous magnetic regions, such that each of the different magnetic regions represents a different bit. In an embodiment, the hard disk drive 100 can be a flash memory drive, such that the recording disk 102 is flash memory. In another embodiment, the HD 102 can be an optical disk.

In an embodiment, the memory 106 can be a computer readable medium, and the memory can include a computer program 110 including instructions for the microprocessor 104, such as instructions for processing the data stored on the HD 102. During a data writing process, the microprocessor 104 preferably utilizes the instructions of the computer program 110 to write the data to the HD 102. In an embodiment, the HD 102 can include a plurality of sectors of data, and each sector can be 512B of data. Additionally, each sector can have parity bits/symbols added to it, such that the parity bits/symbols protect the data against errors through an ECC. The most common ECC used in magnetic recording is a Reed-Solomon (RS) code. A RS code is based on symbols of a certain size, such as 8-bit symbols (bytes) or 10-bit symbols. The parity-symbols in a RS code are obtained as the remainder of dividing the information symbols by a generating polynomial $g(x)$. In an embodiment, a RS code ECC having 10-bit symbols can require 16 parity symbols to correct 8 symbols per sector. A generator polynomial for the RS code would be $g_0(x)=(x-a)(x-a^2) \ldots (x-a^{16})$, where 'a' is a primitive element of $GF(2^{10})$ (see McWilliams and Sloane, The Theory of Error-Correcting Codes). However, for the RS code to correct 16 symbols per sector, the data may be further encoded together with additional parity-symbols using the polynomial $g_1(x)=(x-a^{17})(x-a^{18}) \ldots (x-a^{32})$. The RS code may need an additional 16 parity-symbols that can be stored in a region of the HD 102. In an embodiment, based on a nested property of RS codes, the product $g_0(x) g_1(x)$ gives a RS generator polynomial for a code that can be capable of correcting up to 16 symbol errors per sector. The decoding of the RS codes to recover the user-bits can be made either by hard decoding methods, such as the Berlekamp-Massey decoding algorithm, or by soft decoding methods, such as the Koetter-Vardy (based on the Guruswami-Sudan) decoding algorithm.

During an initial write of data to the HD 102, the microprocessor 104 can utilize an extra strength ECC, which may be able to correct 16 symbol errors per sector. Depending on the amount of data written to the HD 102, multiple sectors on the HD may be used. The microprocessor 104 can use the extra strength ECC during the initial write of the data so that specific bit-error ratio (BER) requirements can be met. The microprocessor 104 can correct any written-in errors of the data when the microprocessor reads the data from the HD 102, and encodes the data based on the parity-symbols of the extra strength ECC. However, the extra strength ECC can require a large number of parity-symbols so that the extra strength ECC can correct the desired number of errors, as discussed above. Thus, the amount of data that can be stored on the HD 102 may be reduced based on the number of parity-symbols of the extra strength ECC that are also being stored on the HD.

During periods when no real-time input/output (I/O) operations are being performed, the microprocessor 104 can process the data stored on the HD 102 in an iterative fashion to reduce the ECC overhead, compact the channel data, and increase the user-bit density of the HD. The ECC overhead can be considered as the ratio between the number of parity-symbols stored on the HD 102 and the total number of symbols stored on the HD. During the processing, the microprocessor 104 can read the data from the HD 102, can read the extra strength ECC associated with the data, and can store the data as first channel bits in the buffer 108. In an embodiment, the first channel bits can be a string of bits and/or islands within a channel of a sector in the HD 102. The microprocessor 104 can encode first channel bits using the extra strength ECC to recover user-bits or a desired writing of the data, as shown as user-bits 206 in FIG. 2. The microprocessor 104 can then store the user-bits in the buffer 108, for further reference by the microprocessor. If a high priority I/O operation interrupts the processing of the data, the user-bits stored in the buffer 108 may be lost because the entire buffer may be needed for the high priority I/O operation. If the entire buffer 108 is needed the user-bits may be deleted. However, after the high priority I/O operation is completed, the microprocessor 104 can recover the user-bits again by decoding the original data from the HD 102 based on the extra strength ECC. In another embodiment, the microprocessor 104 can store the user-bits on an unused sector of the HD 102, such that the user-bits can be retained if a high priority I/O operation interrupts the processing of the data.

Upon microprocessor 104 storing the user-bits in the buffer 108, the microprocessor can encode the user-bits using a weaker strength ECC and can store the recovered bits in the buffer as second channel bits. The weaker strength ECC preferably does not use as many parity-symbols as the extra strength ECC, thus less of the HD 102 is used by the weaker strength ECC. The microprocessor 104 can compare the second channel bits with the user-bits to determine the exact location of errors in the second channel bits. Then the microprocessor 104 can apply a write phase shift to the second channel bits to create third channel bits.

In an embodiment, the write phase can be adjusted on a bit-by-bit basis to accommodate local variations in media and magnetic properties of the HD 102, as well as to incorporate correction for local pattern-dependent magnetic field variations of the HD. The write phase shift can either delay or advance a write current and/or a write control signal provided to a bit in an attempt to correct any bit error within the second channel bits. The third channel bits can be written to the buffer 108 based on the write phase shift. The microprocessor 104 can compare the third channel bits to the user-bits to determine if any bit errors were corrected. The microprocessor 104 can increment and decrement the write phase shifts between a minimum offset and a maximum offset. The maximum offset for a bit can be the maximum amount that the write current can be delayed or advanced without affecting the writing of a neighboring bit. In an embodiment, the maximum offset can be plus or minus 2 ns. In another embodiment, the maximum offset can be plus or minus 1 ns. Each time the microprocessor 104 applies a new write phase shift, the microprocessor can write new channel bits in the buffer 108, and the microprocessor can compare the new channel bits to the user-bits to determine if any bit errors were corrected.

Upon the write phase shift incrementing such that the write phase shift is equal to the maximum offset, the microprocessor 104 can set a write phase offset to a value between the minimum offset and the maximum offset that corrects the bit errors in the channel bits. Additionally, an offset margin can be determined for each of the error bits within the channel bits. The offset margin for an error bit can be the number of write phase offsets that correct the error bit. If the offset margin is greater than a threshold offset margin and the number of error bits is below a threshold number, the current channel bits of the data can be rewritten to the HD 102. The rewritten data can be much more reliable than the originally written data, thus a weaker ECC can be used for the data and the locations of the parity-symbols for the extra strength ECC can be released. Thus, based on the extra parity-symbols of the extra strength ECC being released and/or deleted, the rewritten data can be more compacted on the HD 102, which in turn can increase user-bit density of the HD. The microprocessor 104 can also store information indicating the sectors of the HD 102 that have been compacted. In an embodiment, the information can be stored on the HD 102.

In an embodiment, if the HD 102 is flash memory, the strength of the ECCs used to write the data to the flash memory can vary from those used in the HD. For example, the microprocessor 104 can first write the data to the flash memory using a weak ECC without causing the data to be unreliable. However, the bits of the flash memory can degrade over the use of the flash memory. Thus, as the flash memory is continually written to and read from, more errors can be written onto the flash memory because of degraded bits. Therefore, as the number of times that flash memory is used increases, the microprocessor 104 can increase the strength of the ECC used to write the data to the flash memory to ensure that the data can be read back reliably.

In an embodiment, there can be situations where some errors cannot be eliminated, such as missing bits and/or islands, extreme off-track island position, and the like, but statistically the resulting optimization of the write-offset improves the margin of the storage device against the hard errors overwhelming the ECC. The microprocessor 104 can continue to process the data iteratively so that the ECC can go from the extra strength ECC to a less strong ECC, then to an even less strong ECC, and the like.

In an embodiment, since the probability of a large phase slip, such as missing one or more islands, can be finite in bit-patterned recording, the symbol boundaries can also be rebuilt. An iterative analysis of the data in the buffer can be carried out. If restoration of the bit boundaries succeeds, the new symbol boundaries can be accepted. However, if restoration within the buffer fails, the data can be re-read and phase shifts of the read head can be iteratively applied relative to the fixed island locations. The iteration of the read phase-shifts can be similar to the iteration of the phase shifts described above for the write process. In order to fully utilize a once-around resolution and reduce the total time to compact the data of the HD 102, the microprocessor 104 may attempt to compact multiple sectors on a cylinder of the HD at a time. The resulting data can be stored on a different sector of the HD 102 to provide immunity against power failure during the process.

In another embodiment, the ECC may be implemented using other codes that are not RS codes, such as Low Density Parity-Check (LDPC) codes together with soft decoding. In another embodiment, the ECC may alternate RS codes with LDPC codes. In this embodiment, the RS code may be an "inner" code and the LDPC code an "outer" code, or conversely. For example, the data can be first encoded into an outer code, such as a RS code. Then the data together with the RS parity symbols can be further encoded using another code, such as an LDPC code. The second code used to encode the data can be called inner code. At the decoding, these operations are reversed, such that the data can be soft decoded using the LDPC iterative decoder. Then the data can be decoded by applying the decoding algorithm for the RS code.

Figure 2:
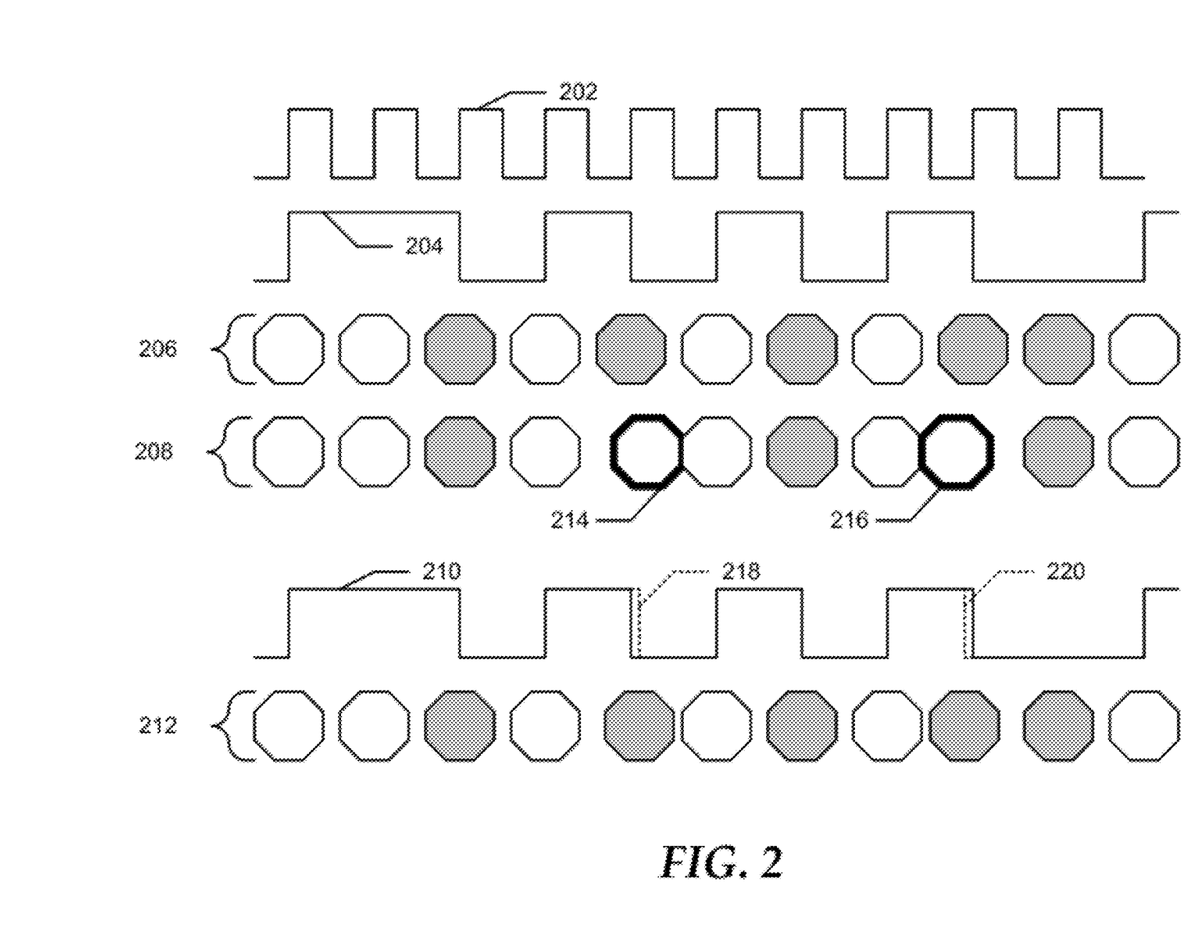
FIG. 2 is a schematic of a plurality of waveforms and channel bits associated with the hard disk drive of FIG. 1.

FIG. 2 is a schematic of a clock signal 202, a wave-form of a write current and/or control signal 204, and bit-patterned media writes of channel bits/islands 206, 208, and 212, and a phase offset write current 210. As indicated in FIG. 2, the first write operation can cause a number of islands within the first channel bits 208 to be written incorrectly, such as islands 214 and 216. Since, the initial writing of the data may have a relatively large probability of written-in errors, an extra strength ECC may be required to enable the correct decoding of the user-bits.

The write current 204 is preferably synchronized with the clock signal 202, such that the desired bit islands can be set during the initial write, such as the channel bits 208. If there are not any real-time I/O operations being performed, the initial write of the first channel bits 208 can be read and compared to the desired writing of the user-bits 206. In an embodiment, the user-bits 206 can be determined by the original data written during the initial write being encoded using the extra strength ECC associated with the original data. The written-in errors in the first channel bits 208 can be the result of position variations of the bit islands 214 and 216.

During the processing of the data as described above, a separate write phase offset can be applied to each of the bit islands 214 and 216 in an attempt to correct the written-in error in the first channel bits 208. The write phase offset can be incremented and decremented between a minimum offset and plus or minus a maximum offset. Each time the write phase offset is incremented or decremented, a new write pass for the bit islands is performed and stored as new channel bits in the buffer. Additionally, during each write pass channel bits are compared to the desired writing of the user-bits 206 to determine whether the bit error has been corrected.

Upon the write phase offset of the write current being equal to the maximum offset, a specific offset value can be selected for each of the bit islands 214 and 216. In an embodiment, a write phase offset associated with the bit island 214 can result in the switching time of the write current 210 to be delayed for the bit island 214, as shown by write current variation 218. Additionally, the write phase offset associated with the bit island 216 can result in the switching time of the write current 210 to be advanced for the bit island 216, as shown by write current variation 220. Thus, based on the write current variations 218 and 220, the bit islands can be written correctly. The amount of phase offset selected to either delay or advance the write current 210 can be selected based on the phase offset values that correct the error bit as indicated in error bit table 300 of FIG. 3. Upon the phase offset of the write current 210 being determined for the bit islands 214 and 216 the data can be written as channel bits 212.

In an embodiment, the write current and/or control signal 204 can control the timing of a magnetic field generated by a magnetic write head of the HDD 100. Thus, the write current and/or control signal 204 can cause the magnetic field to set a bit and/or symbol of the HD 102 located below the magnetic write head at specific times of the write current and/or control signal. In another embodiment, the recording disk 102 can be an optical disk, and the current and/or control signal 204 can control the timing of a light from a light source used for heating the recording disk to set a bit of the recording disk under the light source. The light source can be a laser, a light emitting diode (LED), and the like.

Figure 3:
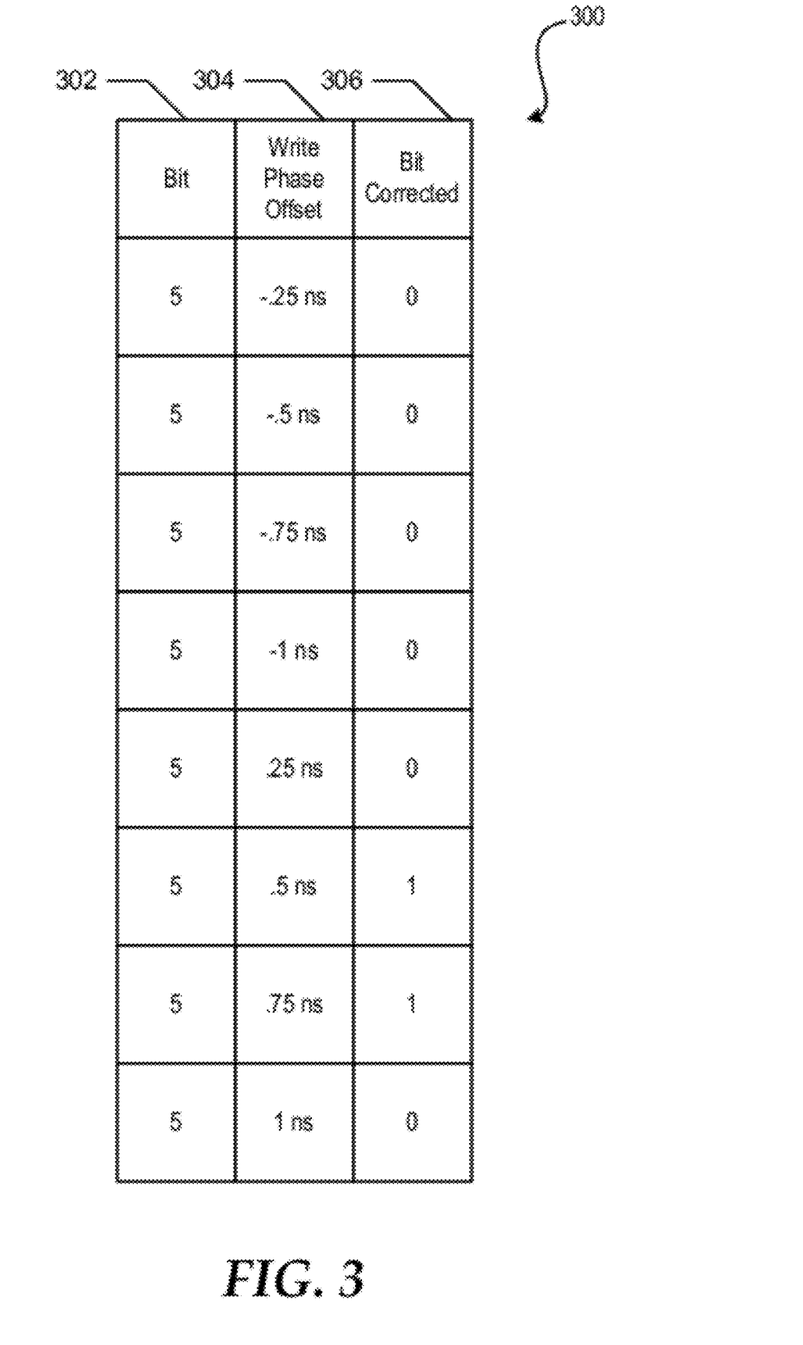
FIG. 3 is a bit error table of write phase offsets associated with the hard disk drive.

Referring to FIG. 3, information associated with each write pass can be stored in an error bit table 300. The error bit table 300 can include a bit column 302, a write phase offset column 304, and a bit corrected column 306. The bit column 302 can include the location of the error bit within the channel bits. For example, bit 5 shown in FIG. 3 can be associated with the bit island 214 of FIG. 2. The write phase offset column 304 can include the write phase offset applied to the write current for the error bit. In an embodiment, the write phase offset can vary between plus and minus 1 ns. The bit corrected column 306 can indicate whether the error bit was corrected with each write phase offset, such that 0 indicates that no correction was made and 1 indicates that a correction has been made. In an embodiment, multiple write phase offsets can correct in the error bit listed in the error bit table 300, such as the phase offsets of 0.5 ns and 0.75 ns. The error bit table 300 can also be used to determine the offset margin for the error bit based on the number of write phase offsets that correct the error bit, as discussed above. Thus, the greater the number of phase offsets that correct the error bit, the higher the offset margin for the error bits.

Figure 4:
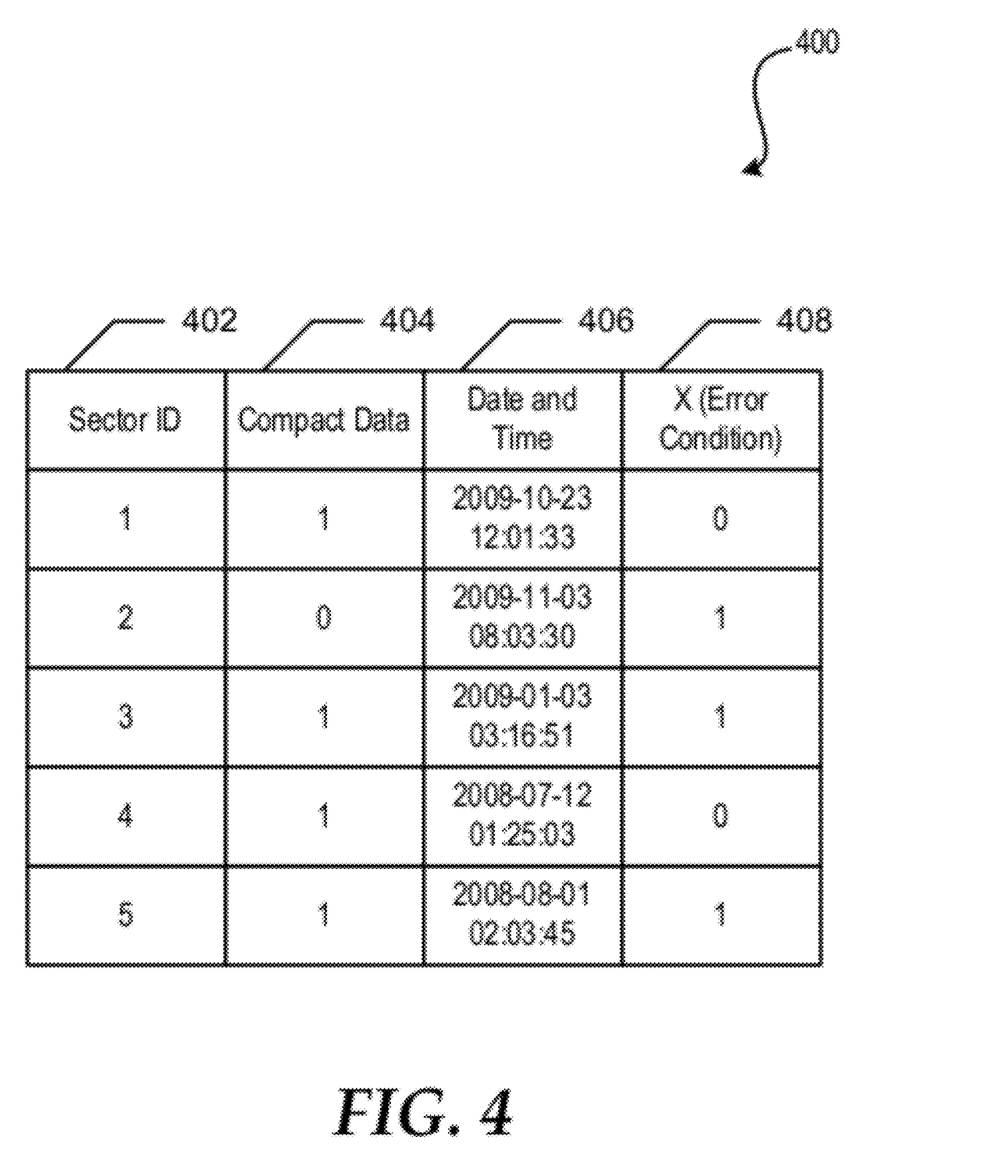
FIG. 4 is a compacted data table of the hard disk drive.

Referring to FIG. 4, a compacted data table 400 can be utilized to track the state of data stored within the HD 102. The compacted data table 400 can include a sector identification (ID) column 402, a compact order column 404, a date and time stamp column 406, and an error condition column 408. The sector ID column 402 can identify the sector of the HD 102 that has been compacted, such as sectors 1, 2, 3, 4, and 5. The compact order column 404 can indicate whether the data in each sector is original data '0' or compacted data '1.' The date and time stamp column 406 can indicated when the last write operation was performed (e.g. time-stamp) for each data sector. The error condition column 408 can indicate whether an error is detected with the data sector, such that '0' indicates that no error is detected and any other integer indicates a different number of errors is detected.

Figure 5:
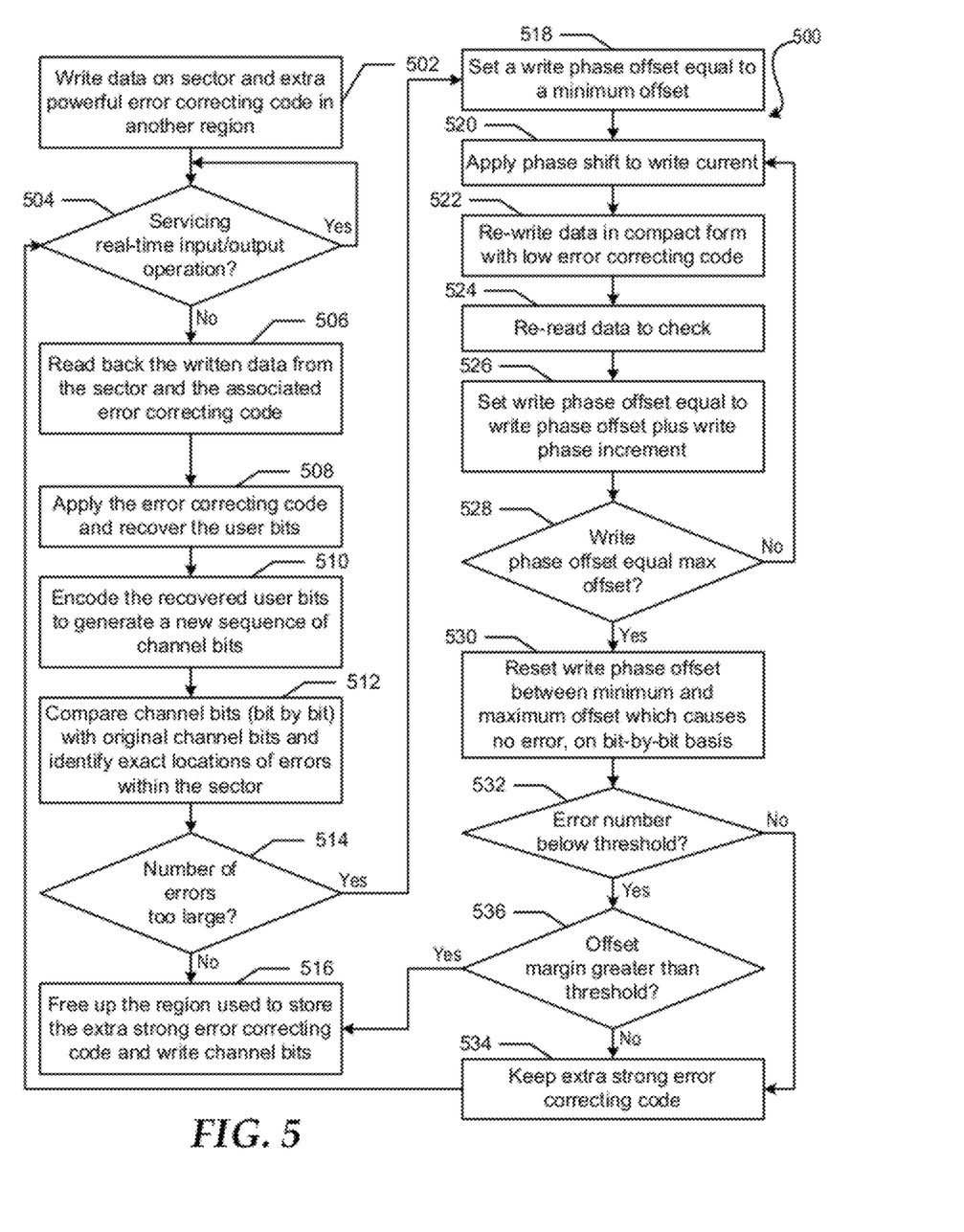
FIG. 5 is a flow diagram of a method for improving the areal efficiency of the hard disk drive by adaptively applying an error-correcting code.

FIG. 5 describes an exemplary method 500 for improving the areal efficiency of a hard disk drive by adaptively applying an ECC. At block 502, data is written on a sector of a HD and an extra powerful ECC associated with the data is written on another region of the HD. At block 504, a determination is made whether a real-time I/O operation is being performed. When a real-time I/O operation is not being performed, the written data is read back from the sector of the HD and the associated ECC is read back from the region of the HD at block 506. At block 508, the extra strong ECC is applied to the data and user-bits for the data are recovered. The recovered user-bits can be stored in a buffer for later reference. The recovered user-bits are encoded using a weaker strength ECC to generate a new sequence of channel bits at block 510. The new sequence of channel bits can be stored in another location of the buffer. At block 512, the new sequence of channel bits is compared bit-by-bit within the user-bits and the exact locations of errors with the sector are identified. The biggest gains in error correction may be derived in noisy environments requiring a much larger initial ECC overhead as compared to conventional hard disk drives (approx. 8% overhead on 512 B sectors). For example, in a noisy environment the initial ECC overhead can be in the range of 20-35%.

At block 514, a determination is made whether the number of errors is too large. The determination can be made by determining if the number of errors is greater than a threshold number of errors. If the number of errors is not too large, the region of the HD used to store the extra strong ECC is freed up so that the weaker strength ECC can be written to the region at block 516 and the channel bits are written to the HD, and the method continues as stated above at block 504. If the number of errors is too large, a write phase offset is set equal to a minimum offset at block 518. At block 520, a phase shift is applied to a write current. The data is re-written in a compact form in the buffer using the weaker strength ECC at block 522. At block 524, the data is re-read to check the data against the user-bits stored in the buffer. The write phase offset is set equal to the write phase offset plus the write phase increment of the phase shift at block 526. At block 528, a determination is made whether the write phase offset is equal to the maximum offset.

If the write phase offset is not equal to the maximum offset, the method continues as stated above at block 520. If the write phase offset is equal to the maximum offset, the write phase offset is reset to an offset value between the minimum and maximum offset that does not cause an error in the channel bits on a bit-by-bit basis at block 530. At block 532, a determination is made whether the error number is below a threshold error number. If the error number is not below a threshold error number, the extra strong ECC is kept at block 534 and the method continues as stated above at block 504. Otherwise, a determination is made whether an offset margin is greater than a threshold offset margin at block 536. If the offset margin is not greater than a threshold offset margin, the extra strength ECC is kept at block 534 and the method continues as stated above at block 504. If the offset margin is greater than a threshold offset margin the region used to store the extra strong ECC is freed up at block 516 and the channel bits are written to the HD, and the method continues as stated above at block 504.

This written description uses examples to disclose the invention, including the best mode, and also to enable those of ordinary skill in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. While the invention has been shown or described in only some of its forms, it should be apparent to those skilled in the art that it is not so limited, but is susceptible to various changes without departing from the scope of the invention.

In a first aspect, a system includes a recording media capable of storing data and a processor configured to: determine that the system is in an idle state of input/output requests, copy first data symbols into a first location within a buffer, correct first data symbol errors using a first error-correcting code, write second data symbols including corrected bits in a second location on the recording media with a second error-correcting code, determine an error number for the second data symbols in the second location, if the error number is below a first threshold error number, delete the first data symbols, and if the error number is above the first threshold error number, delete the second data symbols.

In an example of the first aspect, the first data symbols are written with a weaker error-correcting code and the second data symbols are written with a stronger error-correcting code. In another example of the first aspect, the first data symbols are written with a stronger error-correcting code and the second data symbols are written with a weaker error-correcting code.

In a further example of the first aspect, the recording media is a flash memory. In an additional example of the first aspect, the processor is further configured to create a desired writing of the first data symbols by encoding the first data based on the first error-correcting code.

In a second aspect, a method includes determining that a processor is in an idle state of input/input requests, determining that a first error number for first data written on a recording disk with a strong error-correcting code is above a first threshold error number, applying a first phase shift to a write control signal for the first data on the recording disk, writing second data to a buffer, comparing the second data written in the buffer to a desired writing of the first data, setting the write control signal to have the first phase shift, determining that a second error number for the second data written in the buffer is below the first threshold error number, writing the second data from the buffer to the recording disk with a first error-correcting code, and deleting the strong error-correcting code data on the recording disk.

In an example of the second aspect, a timing of a magnetic field generated by a magnetic write head is controlled by the write control signal. In another example of the second aspect, a timing of the light from a light source used for heating the disk such as a laser or LED is controlled by the write control signal.

In a further example of the second aspect, the first low error-correcting code requires less bits than the strong error-correcting code on the recording disk.

In an additional example of the second aspect, the recording disk is a magnetic hard disk. In another example of the second aspect, the recording disk is a patterned magnetic hard disk. In a further example of the second aspect, the recording disk is a thermally assisted recording magnetic disk. In an additional example of the second aspect, the recording disk is an optical disk.

In another example of the second aspect, the method further includes creating the desired writing of the first data by encoding the first data based on the strong error-correcting code.

In a further example of the second aspect, the method further includes compacting the first data written on the recording hard disk in response to writing the second data with the first weak error-correcting code.

In an additional example of the second aspect, the method further includes storing information on the recording disk indicating sectors of the recording disk that have been compacted.

In another example of the second aspect, the method further includes determining that a third error number for the second data written on the recording disk with the first weak error-correcting code is above a second threshold error number, applying a second phase shift to the write current for the second data, writing third data to the buffer, comparing the third data written in the buffer to the desired writing of the first data, setting the write current to have the second phase shift, determining that a fourth error number for the third data written in the buffer is below the second threshold error number, and writing the third data from the buffer to the recording disk with a second weak error-correcting code.

In a third aspect, a computer readable medium includes a plurality of instructions to manipulate a processor, the plurality of instructions includes instructions to determine that a processor is in an idle state of input/input requests, instructions to determine that a first error number for first data written on a magnetic hard disk with a strong error-correcting code is above a first threshold error number, instructions to apply a first phase shift to a write control signal for the first data, instructions to write second data to a buffer, instructions to compare the second data written in the buffer to a desired writing of the first data, instructions to set the write control signal to have the first phase shift, instructions to determine that a second error number for the second data written in the buffer is below the first threshold error number, and instructions to write the second data from the buffer to the magnetic hard disk with a first weak error-correcting code.

In an example of the third aspect, the first weak error-correcting code requires less bits than the strong error-correcting code on the magnetic hard disk. In another example of the third aspect, the magnetic hard disk is a patterned magnetic hard disk.

In a further example of the third aspect, the computer readable medium further includes instructions to determine an offset margin for the first phase shift and instructions to delete the strong error-correcting code data on the magnetic hard disk. In an additional example of the third aspect, the offset margin is a number of phase shifts that provide a corrected bit in the second data.

In another example of the third aspect, the computer readable medium further includes instructions to create the desired writing of the first data by encoding the first data based on the strong error-correcting code.

In a further example of the third aspect, the computer readable medium further includes instructions to compact the first data written on the magnetic hard disk in response to writing the second data with the weak error-correcting code.

In an additional example of the third aspect, the first phase shift is varied on a bit by bit basis.

What is claimed is:

1. A system comprising:
a recording media capable of storing data;
a processor configured to:
  determine that the system is in an idle state of input/output requests;
  copy first data symbols from a location of the recording media;
  correct the first data symbols using a first error-correcting code;
  write second data symbols including the corrected first data symbols to the location on the recording media with a second error-correcting code;
  determine an error number for the second data symbols;
  compare the error number to a threshold; and
  based on the comparison, record the second error-correction code or alternately keep the first error-correction code.

2. The system of claim 1 wherein the first data symbols are written with a weaker error-correcting code and the second data symbols are written with a stronger error-correcting code.

3. The system of claim 1 wherein the first data symbols are written with a stronger error-correcting code and the second data symbols are written with a weaker error-correcting code.

4. The system of claim 1 wherein the recording media is a flash memory.

5. The system of claim 1 wherein the processor is further configured to:
create a desired writing of the first data symbols by encoding the first data based on the first error-correcting code.

6. A method comprising:
determining that a processor is in an idle state of input/output requests;
determining that a first error number for first data written on a recording disk with a strong error-correcting code is above a first threshold error number;
determining a set of bits based on the first data and the strong error-correcting code;
writing the set of bits to the recording disk by applying a first phase shift to a write control signal;
reading second data from the recording disk, the second data being the read written set of bits;
comparing the second data to the set of bits;
determining a second error number for the second data;
comparing the second error number to a second threshold error number; and based on the comparing:
  writing the second data to the recording disk with a first error-correcting code; and
  freeing a region of the recording disk storing the strong error-correcting code.

7. The method of claim 6 wherein a timing of a magnetic field generated by a magnetic write head is controlled by the write control signal.

8. The method of claim 6 wherein a timing of the light from a light source used for heating the disk is controlled by the write control signal.

9. The method of claim 6 wherein the first error-correcting code requires less bits than the strong error-correcting code on the recording disk.

10. The method of claim 6 wherein the recording disk is a magnetic hard disk.

11. The method of claim 6 wherein the recording disk is a patterned magnetic hard disk.

12. The method of claim 6 wherein the recording disk is a thermally assisted recording magnetic disk.

13. The method of claim 6 wherein the recording disk is an optical disk.

14. The method of claim 6 further comprising:
  creating the desired writing of the first data by encoding the first data based on the strong error-correcting code.

15. The method of claim 6 further comprising:
  compacting the first data written on the recording hard disk in response to writing the second data with the first error-correcting code.

16. The method of claim 6 further comprising:
  storing information on the recording disk indicating sectors of the recording disk that have been compacted.

17. The method of claim 6 further comprising:
  rewriting the set of bits to the recording disk applying a second phase shift to the write control signal;
  reading third data from the recording disk, the third data being the read rewritten set of bits; and
  comparing the third data to the set of bits.

18. A non-transitory computer readable medium comprising a plurality of instructions to manipulate a processor, the plurality of instructions comprising:
  instructions to determine that a processor is in an idle state of input/output requests;
  instructions to determine that a first error number for first data written on a magnetic hard disk with a strong error-correcting code is above a first threshold error number;
  instructions to determine a set of bits based on the first data and the strong error-correcting code;
  instructions to write the set of bits to the recording disk by apply a first phase shift to a write control signal;
  instructions to read second data from the recording disk, the second data being the read written set of bits;
  instructions to compare the second data to the set of bits;
  instructions to determine a second error number for the second data;
  instructions to compare the second error number to a second threshold error number; and
  instructions to write the second data to the magnetic hard disk with a first weak error-correcting code in response to the comparing.

19. The computer readable medium of claim 18 wherein the first weak error-correcting code requires less bits than the strong error-correcting code on the magnetic hard disk.

20. The computer readable medium of claim 18 wherein the magnetic hard disk is a patterned magnetic hard disk.

21. The computer readable medium of claim 18 further comprising:
  instructions to determine an offset margin for the first phase shift; and
  instructions to delete the strong error-correcting code data on the magnetic hard disk.

22. The computer readable medium of claim 21 wherein the offset margin is a number of phase shifts that provide a corrected bit in the second data.

23. The computer readable medium of claim 18 further comprising:
  instructions to compact the first data written on the magnetic hard disk in response to writing the second data with the weak error-correcting code.

24. The computer readable medium of claim 18 wherein the first phase shift is varied on a bit by bit basis.

* * * * *